Figure 1:
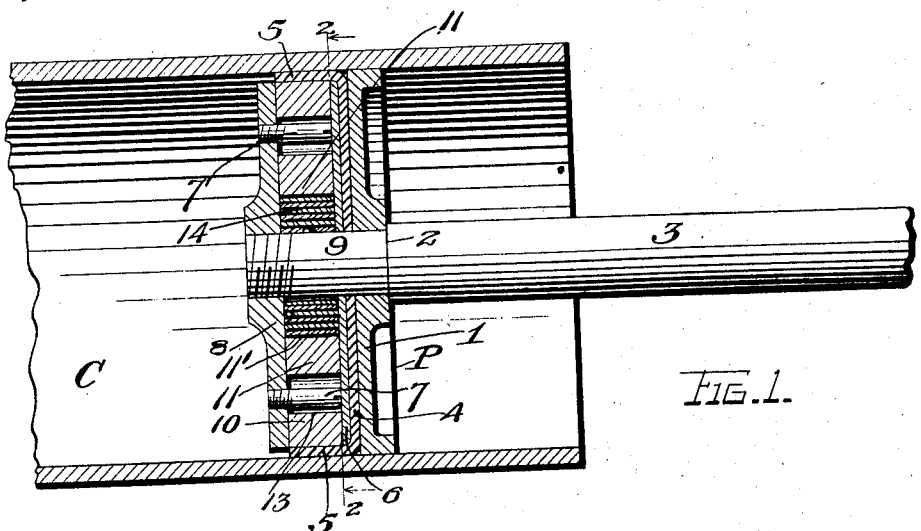

J. A. SLOAN.
PISTON.
APPLICATION FILED FEB. 9, 1914.

1,100,154.

Patented June 16, 1914.

Witnesses
Edwin B. Hunt
H. Woodard

Inventor
John A. Sloan
by H. B. Willson &co
Attorneys

UNITED STATES PATENT OFFICE.

JOHN A. SLOAN, OF WESTVILLE, ILLINOIS, ASSIGNOR OF ONE-HALF TO JOHN JULIUS MATULIS, OF WESTVILLE, ILLINOIS.

PISTON.

1,100,154.  Specification of Letters Patent.  Patented June 16, 1914.

Application filed February 9, 1914. Serial No. 817,582.

*To all whom it may concern:*

Be it known that I, JOHN A. SLOAN, a citizen of the United States, residing at Westville, in the county of Vermilion and State of Illinois, have invented certain new and useful Improvements in Pistons; and I do declare the following to be a full, clear, and exact description of the invention, such as will enable others skilled in the art to which it appertains to make and use the same.

This invention relates to improvements in pistons and more particularly to those which are adapted for use in connection with various forms of pumps.

The primary object of the invention is to provide a simple structure whereby the packing ring will be at all times held in contact with the inner wall of the pump cylinder and whereby a new ring can be quickly and easily applied.

Figure 2:
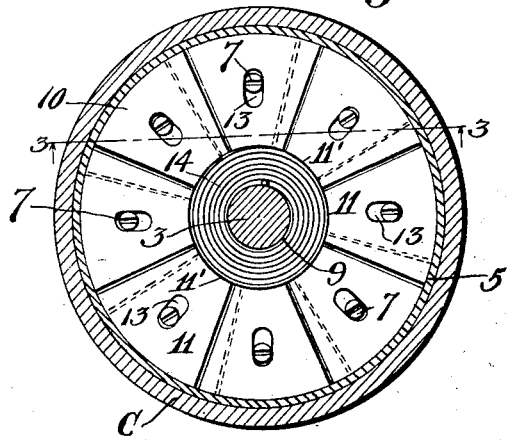
Figure 3:
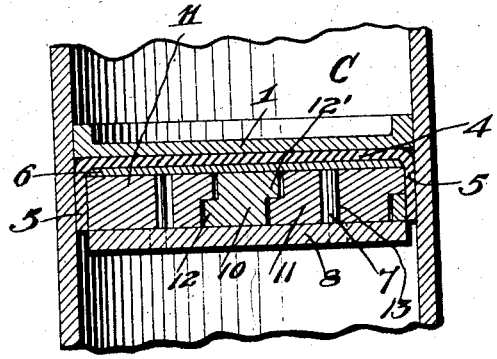
Figure 4:
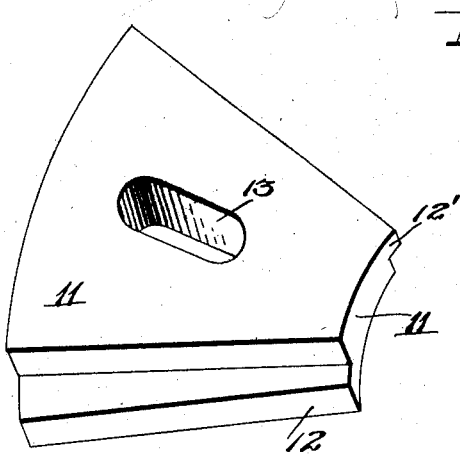

With the above and other minor objects in view, the invention resides in the specific construction and combination herein described and claimed and shown in the drawings wherein:

Figure 1 is a vertical longitudinal section through a portion of a pump cylinder and my improved piston; Fig. 2 is a transverse section on the line 2—2 of Fig. 1; Fig. 3 is a horizontal section on the line 3—3 of Fig. 2; and Fig. 4 is a detail perspective view of one of the arcuate segments which are employed for retaining the packing ring in contact with the inner wall of said cylinder.

In the accompanying drawings, I have shown a portion of a cylinder C which is provided with the usual bore and may be of any desired construction. Mounted for reciprocatory movement in the cylinder C is my improved piston P. The piston P comprises a fixed clamping plate 1 which is adapted to normally rest against a shoulder 2 formed near the inner end of a piston rod 3 which may be connected to any suitable source of power for imparting the proper movement thereto. Contacting with the inner face of the fixed clamping plate 1, is the body portion 4 of a substantially cup-shaped packing element whose flange 5 is adapted to rest normally against the inner side of the cylinder C as clearly shown in Fig. 1. Seated within the flange 5 and contacting with the body portion 4 of said packing element is a movable clamping plate 6 while spaced from said plate 6 by means of studs 7 is a head or cap plate 8 into which is threaded the reduced inner end 9 of the piston rod 3. The studs 7 are preferably in the form of screws having their threaded ends adjustably mounted in threaded openings in said plate 8. Disposed between the movable clamping plate 6 and the head plate 8 and lying within the flange 5 of the packing element, is an expansible ring 10 which is formed of a plurality of arcuate segments 11. Each of the segments 11 is provided with laterally projecting flanges 12 and 12′ on its opposite edges and with a radial slot 13 near its central portion. When the segments are assembled (see Figs. 2 and 3) the flanges 12′ will overlie the flanges 12 and will thus form a continuous ring. When in this position, one of the studs 7 will project through each of the slots 13 for a purpose to appear. As before stated, these segments 11 contact with the inner side of the flange 5 of the packing element and in order to force said segments outwardly to cause said flange to contact with the inner wall of the cylinder C, I provide a coil spring 13 which is secured at its inner end to the reduced portion 9 of the piston rod 3, while its outer convolution and its free end bear against the inner ends 11′ of the segments 11. Thus it will be seen that the normal tendency of said spring is to force the segments 11 outwardly and that they will be guided in their outward movement by the studs 7 which also serve to space the plates 8 and 6 a suitable distance to allow the outward movement of said segment as hereinbefore stated.

By providing the studs 7 in the form of screws, they may be adjusted to such a degree as to space the plates 8 and 6 a greater or less distance. This is a particularly advantageous feature, since, after excessive use, the heads of the screws will undoubtedly become worn to an appreciable extent. This would allow the plates 8 and 6 to contact with the opposite sides of the segments 11 and would prevent the spring from exerting the proper outward movement upon said segments. By the construction shown, however, when said screws become worn, they may be turned to cause their heads to travel away from the plate 8 a sufficient degree to provide sufficient space for the proper operation of said segments.

By threading the end of the extension 9 into the plate 8, the parts may be readily removed by simply removing the piston and piston rod from the cylinder and unscrewing said rod from its engagement with the plate 8. This operation is often rendered necessary for the purpose of applying a new packing element. Any difference in thickness which may occur between the element formerly used and the new element being applied, will be compensated for by the sliding engagement of the clamping plate 6 with the extension 9 and by the inward radial movement allowed the segments 11 by the spring 13.

From the foregoing description, taken in connection with the accompanying drawings, it will be readily seen that I have produced a piston of extremely simple construction, which will perform the work for which it is designed with great efficiency. Changes in the form, proportion and minor details may be resorted to without departing from the spirit of the invention as claimed.

Having thus described my invention, what I claim as new and desire to secure by Letters Patent is:

1. A piston comprising a fixed clamping plate, a cup shaped packing element having one side of its body in contact within said plate, a movable clamping plate with the flange of said element and contacting with the other side of the body thereof, a head plate spaced from said movable clamping plate, studs projecting longitudinally from said head plate and contacting with said movable clamping plate, a piston rod having a reduced threaded extension passing loosely through said clamping plate, whereby the body of said packing element is securely clamped, a plurality of arcuate segments disposed between said head plate and said movable clamping plate and each having a radial slot, said studs passing loosely through said slots, and a spring for forcing said segments radially outward into contact with the flange of said packing element.

2. A piston comprising a fixed clamping plate, a cup shaped packing element having one side of its body in contact with said plate, a movable clamping plate within the flange of said element and contacting with the other side of the body thereof, a head plate spaced from said movable clamping plate, screws threaded into and projecting longitudinally from said head plate and contacting with said movable clamping plate, a piston rod having a reduced threaded extension passing loosely through said clamping plate and threaded into said head plate, whereby the body of said packing element is securely clamped, a plurality of arcuate segments disposed between said head plate and said movable clamping plate and each having a radial slot, said screws passing loosely through said slots, and a spring for forcing said segments radially outward into contact with the flange of said packing element.

3. A piston comprising a clamping plate, a cup-shaped packing element in contact with said plate, a movable clamping plate within said packing element, a head plate spaced from said movable clamping plate, studs threaded into and projecting longitudinally inward from said head plate, their free ends contacting with said movable clamping plate, a piston rod passing loosely through said clamping plate and threaded into said head plate, a plurality of arcuate segments disposed between said head plate and movable clamping plate and each having a radial slot therein, said studs passing loosely through said slots, and a coiled spring encircling said piston rod between it and the inner ends of said segments for forcing said segments radially outward into contact with the flange of said packing element.

In testimony whereof I have hereunto set my hand in presence of two subscribing witnesses.

JOHN A. SLOAN.

Witnesses:
JOHN J. MATULIS,
A. L. SOMERS.